United States Patent [19]

Almasi et al.

[11] 3,893,089

[45] July 1, 1975

[54] TWO-PHASE PROPAGATION OF CYLINDRICAL MAGNETIC DOMAINS

[75] Inventors: George S. Almasi, Purdy Station; George E. Keefe, Montrose, both of N.Y.

[73] Assignee: International Business Machines Corporation, Armonk, N.Y.

[22] Filed: Apr. 3, 1973

[21] Appl. No.: 347,516

Related U.S. Application Data

[63] Continuation of Ser. No. 132,954, April 12, 1971, abandoned.

[52] U.S. Cl. ...................... 340/174 TF; 340/174 SR

[51] Int. Cl. ...................... G11c 11/14; G11c 19/00

[58] Field of Search.. 340/174 TF, 174 MC, 174 SR

[56] References Cited

UNITED STATES PATENTS

| | | | |
|---|---|---|---|
| 3,092,813 | 6/1963 | Broadbent | 340/174 TF |
| 3,295,114 | 12/1966 | Snyder | 340/174 MC |
| 3,454,939 | 7/1969 | Michaelis | 340/175 TF |
| 3,460,116 | 8/1969 | Bobeck et al. | 340/174 TF |
| 3,476,919 | 11/1969 | Bachand | 340/174 MC |
| 3,506,975 | 4/1970 | Bobeck et al. | 340/175 TF |
| 3,508,225 | 4/1970 | Smith | 340/174 TF |
| 3,534,341 | 10/1970 | Sherwood et al. | 340/174 TF |
| 3,564,518 | 2/1971 | Fischer | 340/174 TF |
| 3,636,531 | 1/1972 | Copeland | 340/174 TF |

*Primary Examiner*—Stanley M. Urynowicz, Jr.
*Attorney, Agent, or Firm*—Jackson E. Stanland

[57] ABSTRACT

A two-phase conductor means for propagation of cylindrical magnetic domains (bubble domains) in an underlying magnetic medium, such as orthoferrite or garnet. By pulsing parallel conductors alternately with bi-polar pulses, propagation of domains in the magnetic material is achieved. Very small domains can be used with these conductors and fabrication is more simple than with conventional conductor loops. A bi-directional shift register having four conductors (connected in pairs) per stage is shown.

11 Claims, 8 Drawing Figures

INVENTORS
GEORGE S. ALMASI
GEORGE E. KEEFE

BY J. E. Sfarland
AGENT

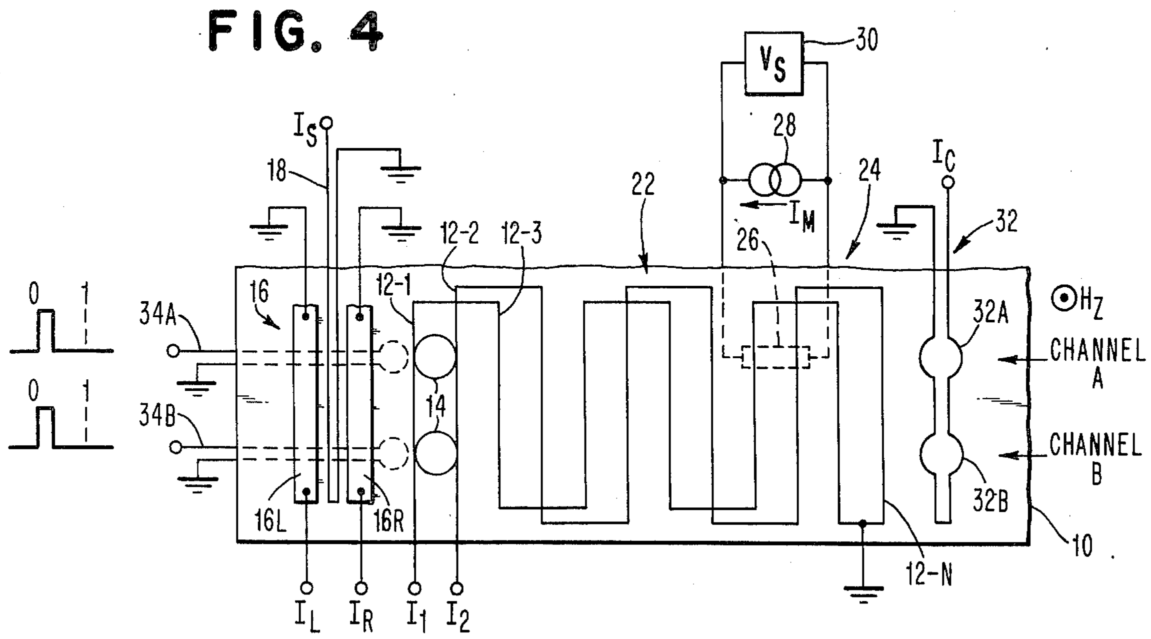
FIG. 5
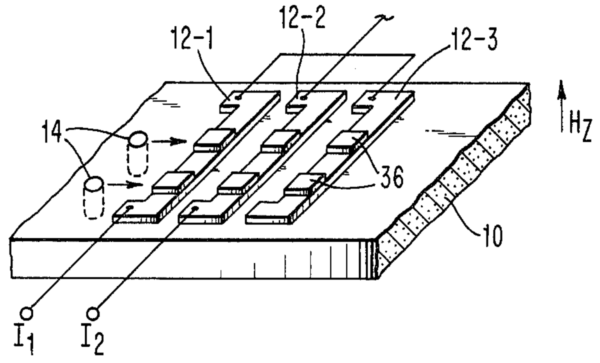
FIG. 6A
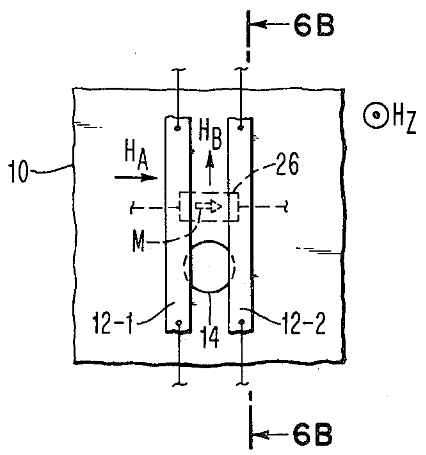
FIG. 6B
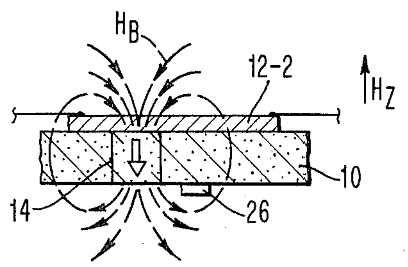

TWO-PHASE PROPAGATION OF CYLINDRICAL MAGNETIC DOMAINS

This is a continuation of application Ser. No. 132,954 filed Apr. 12, 1971, now abandoned.

BACKGROUND OF THE INVENTION

1. Field of the Invention

This invention relates to conductor propagation techniques for cylindrical magnetic domains and more particularly to a simplified conductor technique which avoids the need for conductor loops.

2. Description of the Prior Art

Cylindrical magnetic domains having a single wall unbounded by the medium in which the domains exist are well known, as can be seen by reference to U.S. Pat. No. 3,460,116. These domains are characterized by having a magnetization direction normal to the magnetic sheet in which the domains exist, and oppositely directed to the magnetization direction of the material. As has been established by the prior art, cylindrical magnetic domains, also known as bubble domains, can be propagated throughout the magnetic sheet by a variety of propagation means. One such propagation means comprises permalloy patterns deposited on the magnetic sheet containing the domains, while another propagation means comprises conductor loops deposited on the magnetic sheet. In both of these propagation means, cylindrical domains are attracted to localized magnetic fields directed normally to the magnetic sheet containing the domains. Producing a sequence of localized magnetic fields across the magnetic sheet causes the domains to be attracted to the localized fields and therefore results in propagation of the domains.

Conductor loop propagation techniques are well known in the art, as is apparent by reference to U.S. Pat. No. 3,460,116. In general, the conductor propagation means comprises conductor loops through which currents flow to create a localized magnetic field which interacts with the stray magnetic field of the domain to attract the domain to the loop. Generally, these conductor loop means utilize three or four phase currents, since the domains have to have a certain spacing in order to avoid mutual interaction between domains. Although the prior conductor loop propagation means will move bubbles in two directions across the magnetic sheet, there are disadvantages to this type of propagation technique. For instance, permalloy dots offset from the conductor loops are generally used to create an asymmetry so that magnetic domains will move slightly beyond the loop which attracts them. This slight overshoot will move the domains to positions where they can be influenced by the magnetic field produced by the next succeeding loop. Without this, there would be an equal attractive pull from the left adjacent loop and from the right adjacent loop and a preferred direction of domain movement would not result. The permalloy dots cause the domains to have a preferred direction of movement thereby overcoming this problem. When the permalloy dots are used, the conductor loop propagation is not bidirectional, since the directionality is permanently determined by the position of the deposited permalloy dots.

Another disadvantage of prior conductor loop propagation means involved the relationship between the diameter of a conductivity loop, the width of the conductor, and the domain diameter. The minimum width of a conductor is determined by the techniques used to fabricate the conductor, and is a basic restriction. In conductor loop technology, the domain diameter is at least four times the width of an individual conductor, and the loop diameter is approximately the diameter of a domain. Thus, each bit position requires a considerable amount of area.

Cylindrical domains mutually interact with one another thereby establishing a lower limit for domain density. There is a trade-off between the conductor loop size and the packing density available for a given cylindrical domain size. If the conductor loops have a diameter less than the domain diameter, the domains will have a tendency to move beyond the loop. This will create problems when three phase propagation techniques are used, since the domain will not move a prescribed distance for each applied current pulse.

Although conductor loop propagation has been used for movement of cylindrical domains, such a propagation means is not without problems, as discussed above. These problems primarily center about the difficulty in making small conductor loops in that the lower limit on the size of the loops is set by the minimum line width achievable by photolithographic or other techniques. Thus, these loops are suitable primarily with large cylindrical domains. However, it is desirable to make the domains as small as possible to increase the bit density of useful cylindrical domain devices. To overcome these problems, a two-phase, improved conductor propagation technique is described for movement of magnetic domains more quickly, and with greater packing density. Many of these advantages are present since the diameter of domains usable with this improved conductor propagation means is approximately twice the width of the conductors, rather than at least four times the width, as is normally required.

Another conductor propagation means is shown in U.S. Pat. No. 3,506,975. This is a plurality of zig-zag conductors deposited on the magnetic sheet in which the domains exist. Currents through conductors which are not adjacent to the domains are used to attract the domains. That is, to move a domain from one side of a first conductor to the other side of that conductor requires a current through a second conductor which is adjacent the first conductor. In this propagation means, bidirectional movement by current reversal in a single conductor is not possible.

Accordingly, it is primary object of this invention to provide an improved conductor means for bidirectional propagation of cylindrical magnetic domains.

It is another object of this invention to provide a two-phase conductor means for propagation of cylindrical magnetic domains.

It is still another object of this invention to provide a two-phase conductor propagation means for movement of cylindrical magnetic domains using a minimum number of conductors which are easily fabricated on the magnetic sheet containing the domains.

It is still another object of this invention to provide a conductor propagation means for movement of magnetic domains which allows greater density of the domains.

SUMMARY OF THE INVENTION

A magnetic sheet, such as orthoferrite or garnet, has deposited thereon a conductor propagation means. The conductors can be any simple current carrying materials, such as copper. The conductors are substantially straight lines (strip lines) rather than loops as were previously used.

Cylindrical domains can be made to move from one side of a conductor to the other upon application of current through the conductor. Reversing the direction of current flow will provide movement of the domain in the opposite direction.

The same conductors can be used for propagation of domains in a plurality of channels, rather than requiring separate conductor means for each channel. Therefore, improved packing density and ease of fabrication results. The fabrication problems are further alleviated by the use of straight conductor lines which can be parallel, rather than complicated interleaved conductor loop patterns.

Placement of permalloy on the conductors aids cylindrical domain movement without hindering speed, as was the case with the prior art. Because the permalloy is deposited directly on top of the conductors rather than being offset from them, smaller currents are used to create the attractive magnetic fields for cylindrical domain movement. This leads to decreased power requirements and increased efficiency of domain movement.

A bidirectional shift register using four conductors (connected in pairs) per bit position is shown. This provides an extremely small bit position and leads to increased packing density. Further, the speed of the shift register is increased, since the domains can more quickly move across the small amount of area required for a single bit position. In addition, the conductor line width can be made approximately the radius of the domains and the line spacing can be approximately this distance, thereby increasing density.

These and other objects, features, and advantages will be more apparent from the following more particular description of the preferred embodiments.

BRIEF DESCRIPTION OF THE DRAWINGS

FIG. 4 shows a two-phase shift register for a plurality of domain channels.

FIG. 5 shows a conductor propagation technique using two-phase drive with permalloy located on each conductor means.

FIGS. 6A and 6B show the interaction of the magnetic field produced by a cylindrical domain with the magneto-resistive sensor illustrated in FIG. 2.

DETAILED DESCRIPTION OF THE PREFERRED EMBODIMENTS

Figure 1A:
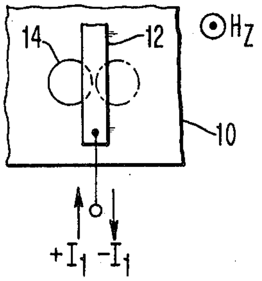
FIG. 1A shows a single conductor strip located on a magnetic medium for movement of domains in response to oppositely directed currents.

FIG. 1A shows a magnetic sheet 10 having a conductor strip 12 deposited thereon. Current $I_1$ through strip 12 causes movement of domain 14 from one side of the strip to the other, depending upon the current direction. For instance, current $+I_1$ causes domain 14 to move from the left side of strip 12 to the right side of strip 12, while current $-I_1$ causes the domain to move in the opposite direction. Movement of the domain in this way is the basis for the two-phase propagation means to be described here.

Figure 1B:
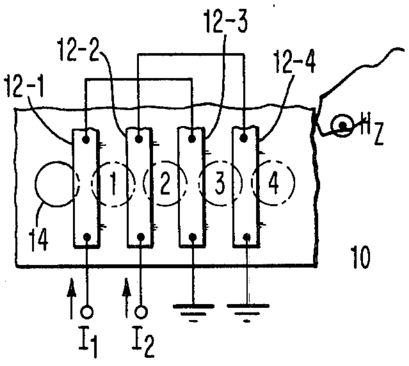
FIG. 1B shows a plurality of conductor strips located on a magnetic sheet, illustrating a single bit position for magnetic domains.

In FIG. 1B, a two-phase propagation scheme using currents $I_1$ and $I_2$ is shown. For ease of understanding, the same reference numerals will be used throughout whenever possible. In FIG. 1B, conductor strips 12-1, 12-2, 12-3, and 12-4 are located on magnetic sheet 10. Conductors 12-1 and 12-3 are electrically connected and receive current $I_1$. Conductors 12-2 and 12-4 are electrically connected and receive current $I_1$. Domain 14 moves to position 1 (shown as a dashed circle) in response to current $+I_1$ in conductor 12-1. Upon subsequent application of current $+I_2$ to conductor 12-2, the domain moves from position 1 to position 2 (also shown as a dashed circle). Upon subsequent application of current $-I_1$ to conductor 12-1, domain 14 then moves from position 2 to position 3 (shown as a dashed circle) to the right of conductor 12-3. When current $-I_2$ is applied to conductor 12-2, the domain moves to position 4. Consequently, two-phase current $\pm I_1$, $\pm I_2$ has moved domain 14 from a position to the left of conductor 12-1 to the right of conductor 12-4. This is a single bit position.

Figure 3:
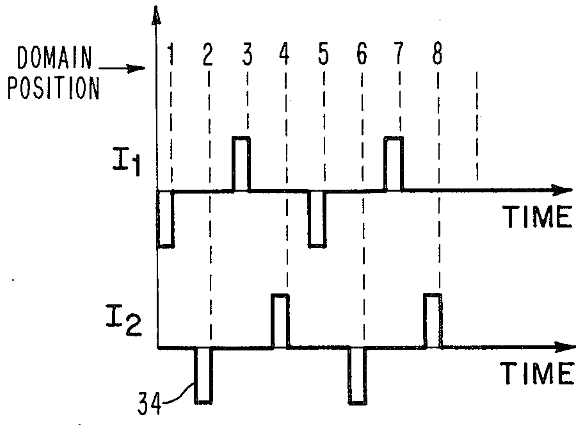
FIG. 3 shows a sequence of applied current pulses used to propagate domains in the shift register of FIG. 2.

In FIG. 1B, the domain can be moved in the opposite direction by shifting $I_2$ with respect to $I_1$ by 180°, or two pulse positions. This will be more apparent when the pulse diagram of FIG. 3 is explained.

As an example of the conductor propagation means of FIG. 1B, copper striplines have been deposited on dysprosium orthoferrite ($DyFeO_3$). The orthoferrite was 2.5 mils thick, and the copper conductors were 1.8 mils wide, spaced 2.2 mils. This corresponded to copper conductors on 4 mil centers. The cylindrical domain diameter was 4.4 mils, and the currents $I_1$ and $I_2$ were 250 milliamps. Five microsecond wide pulses were used for the current pulses, corresponding to a 0.5% duty cycle. A frequency of 1KC was used, but other runs have been made up to approximately 1 megacycle. The copper conductors were 4 microns thick and, in an embodiment similar to that shown in FIG. 5, permalloy regions were deposited on the conductors to a thickness of approximately 1,300 angstroms. This thickness is optional and thicker amounts will work similarly. The width of the permalloy was approximately that of the bubble domain diameter.

In this conductor propagation means, the vertical component of the localized magnetic field produced by current in the conductors attracts the domains. The domain always moves in a direction of diminishing overall bias field. For instance, the domain 14 will move from the left side of conductor 12-1 to the right side of this conductor (position 1) upon current $+I_1$ in the direction shown. Current $+I_1$ will produce a magnetic field directed normal to sheet 10 on each side of conductor 12-1. On the right hand side of this conductor, this localized magnetic field will be oppositely directed to the bias field $H_z$. Therefore, domain 14 will be attracted to this location.

Figure 2:
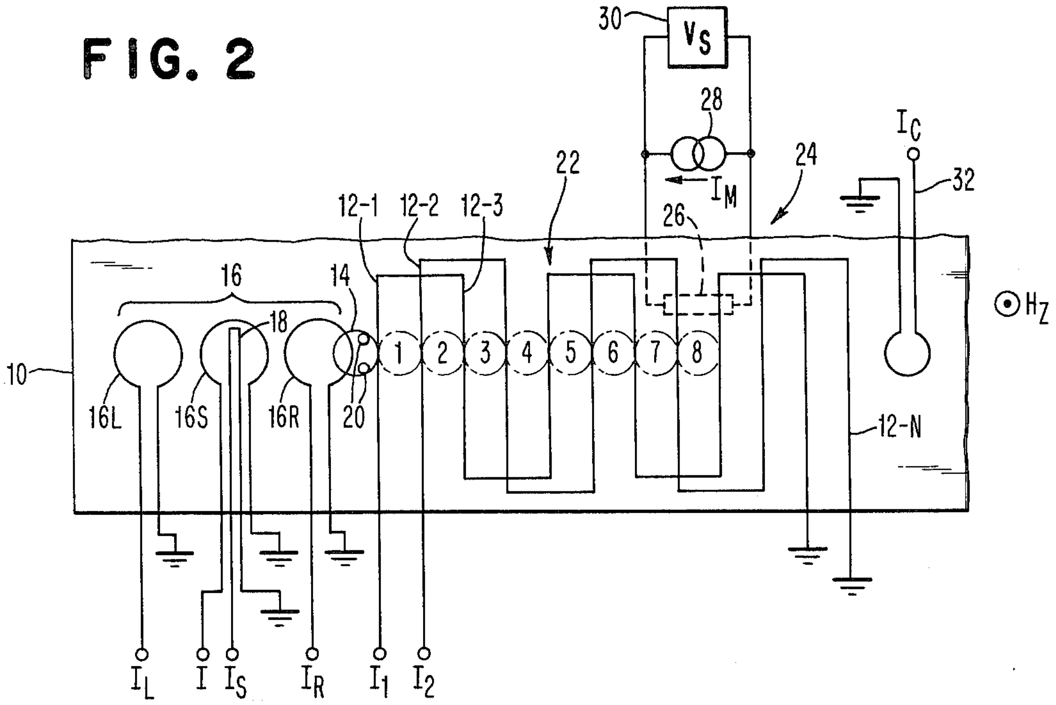
FIG. 2 shows a shift register using a two-phase conductor means in conjunction with other conductors, generators, and busters.

FIG. 2 shows a two-phase shift register using the basic propagation technique outlined in FIGS. 1A and 1B. A series of conductors 12-1, 12-2, 12-3, . . . , 12-N is arranged across magnetic sheet 10. Also provided is a domain generator 16, comprising conductor loops 16L, 16S, and 16R. Located within loop 16S is another loop 18. A cylindrical domain located in loop 16S will be attracted toward left loop 16L by application of a current $I_L$ in that loop, and will be attracted to right loop 16R by a current $I_R$ in that loop. If currents $I_L$ and $I_R$ are applied at the same time as a current $I_S$ is applied to the loop 18, a domain in loop 16S will be split, one portion going to loop 16L and the other portion going to loop 16R. The domain 14 which goes to loop 16R will be offset from this loop by permalloy dots 20 and will be adjacent conductor 12-1. These domains will be propagated by the conductor propagation means 22, which comprises conductors 12-1, 12-2, . . . , 12-N. Upon application of current I in loop 16S the split domain located in loop 16L will be moved to loop 16S where another splitting operation will occur if a domain 14 is to be presented to shift register 22. While this particular domain generator has been shown, it should be understood that any type of generator can be used, as is well known in the prior art.

Shift register 22 comprises a plurality of conductors 12-1, 12-2, . . . , 12-N. Alternate ones of these conductors are electrically connected, as for instance, conductors 12-1 and 12-3. Currents $I_1$ and $I_2$ are applied to the conductors for movement of domain 14 across the shift register 22.

Located on the underside of magnetic sheet 10 is a domain sensing means 24, comprising magneto-resistive sensing element 26 and constant current source 28. Sensing element 26 could be located on the same side of sheet 10 as the conductors if insulated therefrom. Source 28 provides a measuring current $I_M$ through magneto-resistive sensing element 26, in the direction of travel of domain 14. The presence of a domain in the vicinity of sensing element 26 causes a rotation of the magnetization vector of the sensing element, leading to a resistance change in the element which is detected as a voltage change $V_S$ by meter 30. This type of sensing is well known and further details about it can be obtained from copending applications Ser. No. 78,531 filed Oct. 6, 1970, and Ser. No. 89,964 filed Nov. 16, 1970, and assigned to the same assignee as the present invention. The operation of the sensing means 24 will be discussed in some detail with respect to FIGS. 6A and 6B.

Also located on magnetic sheet 10 is a domain buster, comprising conductor loop 32. Current $I_C$ through this loop causes an attractive magnetic field which moves the domain 14 under the loop, after which a magnetic field in the direction of the bias field $H_z$ is applied to collapse the domain. As with the embodiments shown in FIGS. 1A and 1B, a bias field $H_z$ exists normal to magnetic sheet 10 for stabilization of domains therein.

In FIG. 2, the conductors are shown as single wires for ease of illustration. It should be understood that these conductors are preferably striplines deposited on the magnetic sheet by conventional means.

FIG. 3 shows the pulse diagram for the shift register of FIG. 2. Bipolar pulses $I_1$ and $I_2$ are applied to move the domains from position 1 to position 2, etc. In this diagram, the domains are located in the positions numbered at the end of the corresponding applied current pulse $I_1$ or $I_2$. For instance, upon application of current pulse 34 ($I_2$), domain 14 moves from the left side of conductor 12-2 (position 1) to the right side of conductor 12-2 (position 2).

This shift register can be made bidirectional by shifting current $I_2$ with respect to current $I_1$ by 180° or two pulse positions. In contrast with conventional conductor loop patterns employing permalloy for overshoot of cylindrical domains, the conductor means of FIG. 2 has bidirectionality where the normal conductor loop—-permalloy dot propagation means do not have this bidirectionality feature.

FIG. 4 shows an embodiment of a shift register using two phase conductors for movement of domains. This shift register is similar to that shown in FIG. 3, except that a plurality of information channels A and B is shown. Specifically, a shift register 22 comprises conductors 12-1, 12-2, 12-3, . . . , 12-N. These conductors move domains 14 across shift register 22 in response to currents $I_1$ and $I_2$, as was described with respect to FIGS. 2 and 3.

A stabilizing bias field $H_z$ is directed normal to sheet 10. Located on sheet 10 is a bubble generating means 16, comprised of left conductor 16L and right conductor 16R. These conductors have the same function as the loops 16L and 16R of FIG. 2. Located between conductors 16L and 16R is a splitting loop 18. Again, this has the same function as the loop 18 of FIG. 2. Cylindrical domains located between 16L and 16R will be split by the combined action of current $I_L$, $I_R$, and $I_s$. Current $I_L$ in conductor 16L will tend to move a domain located between 16L and 16R to the left, while current $I_R$ in conductor 16R will tend to move the domain to the right. Current $I_s$ in loop 18 will pinch the center of the domain, causing it to split into two portions. One portion will travel to the right to be an input to shift register 22 while the other will travel to the left. For the next cycle, the split domain which has moved to the left of conductor 16L will be brought to a position between conductors 16L and 16R for another splitting cycle.

Conductor loops 34A and 34B are located on the under side of magnetic sheet 10. These are the binary 1 and 0 controls for the channels. That is, domains 14 from generator 16 will be collapsed by a current in these loops. A "0" bit is represented by a current pulse in the loop while a 1 bit (corresponding to the presence of domains) occurs when no current pulse enters control loops 34A and 34B.

After propagation in channel A or channel B, the domain is collapsed by domain buster 32. Current $I_c$ in loops 32A and 32B creats a small magnetic field which augments the bias field $H_z$ to overcome the stability condition and collapse the domains. Of course, the propagation means could be gradually turned around corners in order to provide a closed loop shift register.

FIG. 5 shows a two phase conductor propagation means comprising conductors 12-1, 12-2, 12-3, etc., located on magnetic sheet 10. Directed normal to sheet 10 is the stabilizing bias magnetic field $H_z$. Cylindrical domains 14 propagate across magnetic sheet 10 in accordance with currents $I_1$ and $I_2$ through the conductors, as described previously. This embodiment differs from the others shown in that each conductor 12 has deposited thereon a permalloy region 36. In the specific examples previously cited, the permalloy was approximately 1,300 Angstroms in thickness having a width approximately half that of the domains. However, these dimensions can be varied greatly in view of the functions which the permalloy performs.

The permalloy regions 36 provide stable positions for the cylindrical domains during their movement across sheet 10. That is, the permalloy regions 36 provide flux closure paths for the stray magnetic fields from the domains, keeping the domains moving in a straight line across sheet 10 rather than having a sidewards motion transverse to a direction normal to conductors 12-1, 12-2, etc. In addition, the permalloy regions 36 act as keepers for the magnetic fields produced by currents $I_1$ and $I_2$ through the conductors. This means that less current will be needed since the magnetic field produced by the current does not spread out, thereby decreasing its flux density. Correspondingly, this aids domain propagation since the domain speed is proportional to the product of the domain mobility and the drive force. Use of the keeper concentrates the magnetic field and therefore increases the drive force.

Unlike the permalloy dots used with previous conductor loops, the permalloy regions 36 located on conductors 12 do not hinder domain movement. The location of the permalloy on conductors 12 insures that the field associated with the permalloy enhances rather than impedes the driving force due to current in the conductors 12.

FIGS. 6A and 6B are a top view and side view respectively of a conductor pattern and a magneto-resistive sensing element 26, deposited on sheet 10. FIG. 6B has been rotated 90°cw in order to clearly illustrate the magnetic flux lines. Magnetic bias field $H_z$ normal to sheet 10 provides stabilization. Only conductors 12-1 and 12-2 are shown in this diagram, for simplicity. The domain 14, in traveling from the left of conductor 12-1 to a position between conductors 12-1 and 12-2 has a stray magnetic field $H_B$ associated with it which is directed normally to the magnetization vector M of magneto-resistive sensing element 26. The applied propagation field due to current in the conductors is shown by the arrow $H_A$.

In FIG. 6B, the magnetic flux lines of the stray field $H_B$ are shown encircling magneto-resistive sensing element 26. Since these field lines are transverse to the magnetization vector M of element 26, vector M will be rotated, resulting in a resistance change in element 26 which will be detected as a voltage $V_S$ as described previously.

The conductor pattern described here can be fabricated by many conventional techniques, including those used to make prior art conducting loop patterns. The conductors are most conveniently deposited as strip-lines on the magnetic medium. Evaporation, plating, sputtering, etc., can be used to deposit copper or other suitable conductors. The conductors are fabricated using standard photolithographic techniques. Of course, electron beam fabrication could also be used. After deposition of the conductors, permalloy regions 36 can be deposited on these conductors. Again, evaporation, sputtering, or plating techniques can be used to deposit permalloy, as is well known in the art. Electrical connections have been made between alternate conductors, and current sources are connected to the terminals shown.

What has been shown is a simplified two-winding conductor propagation means which is very easy to fabricate and provides closely packed domain propagation. A bit storage position of a shift register using this means will include only four conductor strips, and these can be made one half the width of the domains. Since a single wire can be used to move a domain, it is possible to utilize permalloy in conjunction with a single wire (FIG. 1) to provide a on phase conductor propagation means.

What is claimed is:

1. A conductor propagation means for movement of magnetic bubble domains, comprising:

a magnetic medium in which said bubble domains can be propagated, a plurality of substantially parallel conductors, each having at least two oppositely facing surfaces and having a substantially constant slope along its length with one of said at least two surfaces of each conductor located adjacent said magnetic medium for propagation of said bubble domains in said magnetic medium when current flows through sequentially displaced conductors wherein adjacent conductors are electrically unconnected to each other, said domains moving from one side of a conductor to the other side of said conductor when current flows through said conductor, electrical means for providing current through said conductors to produce propagation magnetic fields, said current being provided through sequentially displaced conductors for movement of said bubble domains in said magnetic medium, and magnetically soft material located with respect to said conductors such that the magnetic fields of said magnetically soft material add to said propagation magnetic field in the vicinity of said conductors, said magnetically soft material being in the form of discrete elements located over the surface of each said conductor remote from said magnetic medium.

2. The means of claim 1, where said magnetically soft material is located on said conductors.

3. The means of claim 1, where said magnetically soft material is permalloy.

4. The means of claim 1, where said conductors are separated by approximately the radius of said domains.

5. The means of claim 1, where said conductors are common to a plurality of domain propagation channels.

6. The means of claim 1, where said conductors have a width approximately the same as the radius of said domains.

7. The means of claim 1, where said conductors are substantially straight.

8. The means of claim 1, where alternate ones of said conductors are electrically connected to one another.

9. The means of claim 8, where said currents are bipolar pulses which propagate in sequentially addressed conductors.

10. A conductor propagation means for movement of magnetic bubble domains, comprising:

a magnetic medium in which said bubble domains can be propagated, a plurality of substantially straight conductors, each having at least two oppositely facing surfaces with one of said at least two surfaces of each conductor located adjacent said magnetic medium for propagation of domains in said medium in response to current in said conductors wherein adjacent conductors are electrically unconnected to each other, said domains moving from one side of any conductor to the other side of said any conductor in response to current in said any conductor, electrical means for providing currents in adjacent sequentially displaced conductors for creation of propagation magnetic fields for movement of domains in said magnetic medium, discrete elements of magnetically soft material positioned over the surface of each said conductor remote from said magnetic material such that said propagation magnetic fields produce magnetic fields associated with said magnetically soft material which add to the propagation magnetic fields produced by current in said conductors.

11. The means of claim 10, wherein said magnetically soft material is permalloy located such that said conductors are between said permalloy and said magnetic medium.

* * * * *